＝
US007965289B1

(12) United States Patent
Green et al.

(10) Patent No.: US 7,965,289 B1
(45) Date of Patent: Jun. 21, 2011

(54) APPARATUS, SYSTEM, AND METHOD FOR RENDERING OBJECTS WITH POSITION AND ORIENTATION COMPUTED ON A GRAPHICS PROCESSING UNIT

(75) Inventors: Simon G. Green, London (GB); Mark J. Harris, London (GB); Oliver Strunk, Munich (DE)

(73) Assignee: NVIDIA Corporation, Santa Clara, CA (US)

( * ) Notice: Subject to any disclaimer, the term of this patent is extended or adjusted under 35 U.S.C. 154(b) by 461 days.

(21) Appl. No.: 11/486,189

(22) Filed: Jul. 12, 2006

(51) Int. Cl.
*G06T 15/00* (2011.01)
*G06T 1/00* (2006.01)
(52) U.S. Cl. .................. 345/419; 345/501; 345/552
(58) Field of Classification Search .................. None
See application file for complete search history.

(56) References Cited

U.S. PATENT DOCUMENTS

| 7,379,599 | B1* | 5/2008 | Blais-Morin et al. | 382/217 |
| 2006/0106591 | A1* | 5/2006 | Bordes et al. | 703/22 |
| 2007/0067517 | A1* | 3/2007 | Kuo | 710/100 |

OTHER PUBLICATIONS

Georgii, J. Echtler, F., and Westermann, R. 2005. Interactive simulation of deformable bodies on gpu. In Proceedings of Simulation and Visualization 2005, 247-258.*
Masafumi Takahashi and Kazunori Miyata, GPU based interactive displacement mapping, IWAIT 2005, Session PS4 Computer Graphics and Animation, pp. 477-480.*
D. Baraff and A. Witkin. Physically-Based Modeling. ACM SIGGRAPH Course Notes, 2001.*
R. Strzodka, M. Doggett and A. Kolb, Scientific computation for simulations on programmable graphics hardware, Simulation Modelling Practice and Theory 13 (8) (2005), pp. 667-680.*
Kolb, A., Latta, L., and Rezk-Salama, C. 2004. Hardware-based simulation and collision detection for large particle systems. In Proceedings of the ACM SIGGRAPH/EUROGRAPHICS Conference on Graphics Hardware (Grenoble, France, Aug. 29-30, 2004). HWWS '04. ACM, New York, NY.*
Youquan Liu, Xuehui Liu, and Enhua Wu. 2004. Real-Time 3D Fluid Simulation on GPU with Complex Obstacles. In Proceedings of the Computer Graphics and Applications, 12th Pacific Conference (PG '04). IEEE Computer Society, Washington, DC, USA.*
Zeller, C.: Cloth simulation on the GPU. In: ACM SIGGRAPH 2005 Conference Abstracts and Applications (2005).*
Nvidia Corporation, "SDK White Paper—Improve Batching Using Texture Atlases", Jul. 2004, Santa Clara, CA 17 pgs.
Nvidia Corporation, "White Paper—Shader Model 3.0 Using Vertex Textures", Jun. 24, 2004, Santa Clara, CA 14 pgs.

* cited by examiner

*Primary Examiner* — Daniel F Hajnik
(74) *Attorney, Agent, or Firm* — Cooley LLP

(57) ABSTRACT

A graphics processing unit calculates transformation matrices for changes to the position and orientation of objects. The graphics processing unit applies the transformation matrices to vertices of objects to be rendered.

18 Claims, 8 Drawing Sheets

APPARATUS, SYSTEM, AND METHOD FOR RENDERING OBJECTS WITH POSITION AND ORIENTATION COMPUTED ON A GRAPHICS PROCESSING UNIT

FIELD OF THE INVENTION

The present invention is generally related to simulations in which the position and orientation of objects is computed. More particularly, the present invention is directed towards computing the position and orientation of objects in a graphics processing unit to facilitate rendering of objects.

BACKGROUND OF THE INVENTION

Rigid body simulations are a class of computations in which the motion of rigid objects is simulated. Newtonian mechanics may be used to determine the motion of objects. The objects may interact with each other or with boundaries such that the position and momentum of the objects changes during the simulation. For example, rigid bodies may collide with each other and change their direction and velocity. As other examples, in classical physics, objects may interact with each other due to gravitational or electrostatic forces.

FIG. 1 illustrates a prior art computing system for performing rigid body simulations. A rigid body simulation program 110 is stored on a computer memory. The rigid body simulation executes on a central processing unit (CPU) 105. The position and orientation of each object is traditionally represented by matrices, such as 4×4 matrices, to represent position and orientation. A matrix transformation is performed to calculate changes in position and orientation of an object. Consequently, the rigid body simulation program 110 typically includes a module 115 for performing transformation matrix calculations on CPU 105.

In many applications it is desirable to generate a graphical representation of the rigid body simulation on a display screen. Consequently, the CPU may generate graphics commands providing position and orientation information that are provided to a graphics processing unit (GPU) 120 to render the results of the rigid body simulation into images.

One drawback of prior art systems for performing rigid body simulations is the difficulty associated with performing rigid body simulations on a large number of objects. Significant CPU computing resources are required to compute the transformation matrices, particularly as the number of objects increases. In addition, significant bandwidth is consumed by transmitting the transformation data from the CPU to the GPU every frame.

Therefore, what is desired is an improved apparatus, system, and method for calculating position and orientation of objects in a rigid body simulation.

SUMMARY OF THE INVENTION

A graphics processing unit determines changes to the position and orientation of objects. The graphics processing unit provides transformation information to a geometry processing portion of a graphics pipeline to transform the positions of vertices to be rendered. In one implementation the graphics processing unit may be used to calculate changes to the position and orientation of objects without requiring the graphics processing unit to send results back to the CPU for further processing of transformation matrices.

One embodiment of a graphics system includes a graphics processing unit (GPU) having a graphics pipeline. A graphics memory is coupled to the graphics processing unit. At least one pathway is provided for a geometry processing portion of the graphics pipeline to read textures stored in the graphics memory. The GPU is configured to determine changes in the position and orientation of objects and store transformation information describing changes in position and orientation of objects as textures in the graphics memory. The geometry processing portion of the graphics pipeline reads the transformation information and applies the transformation information to transform the position of vertices of objects to be rendered.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
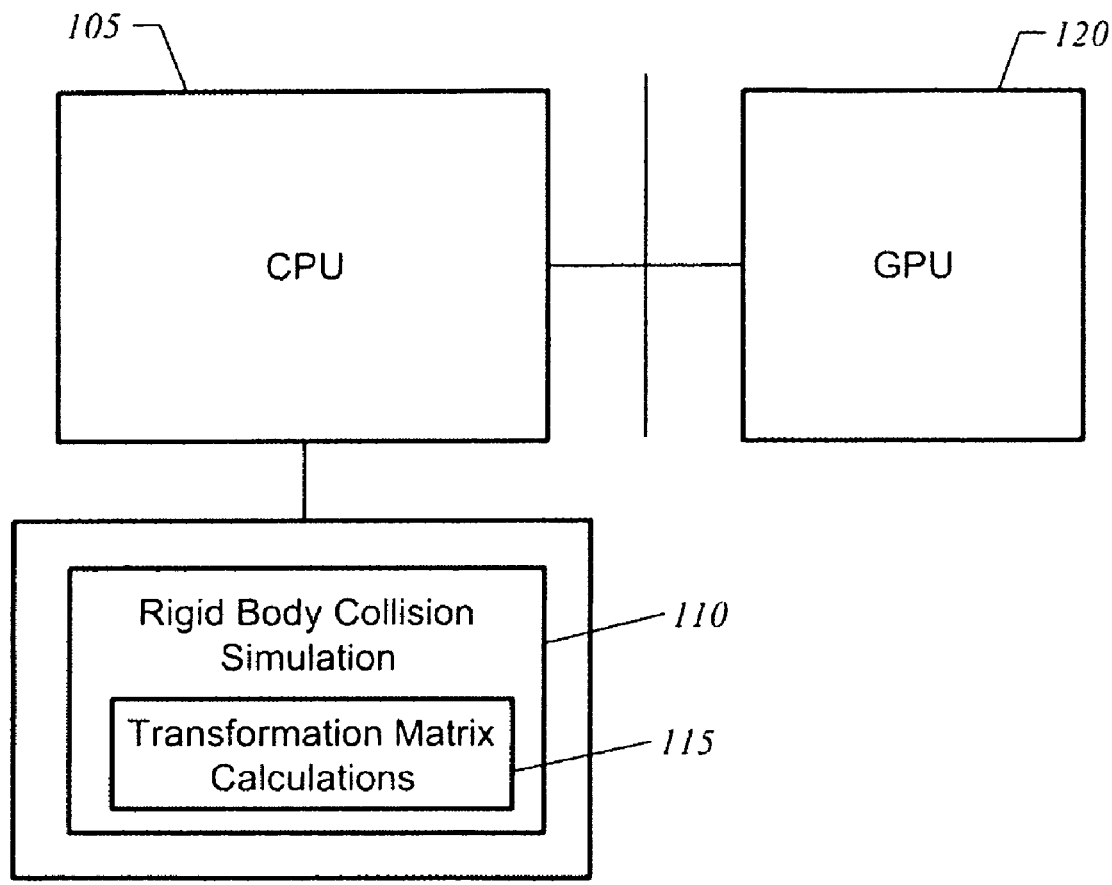
FIG. 1 is a block diagram illustrating a prior art system for performing rigid body simulations.
Figure 2:
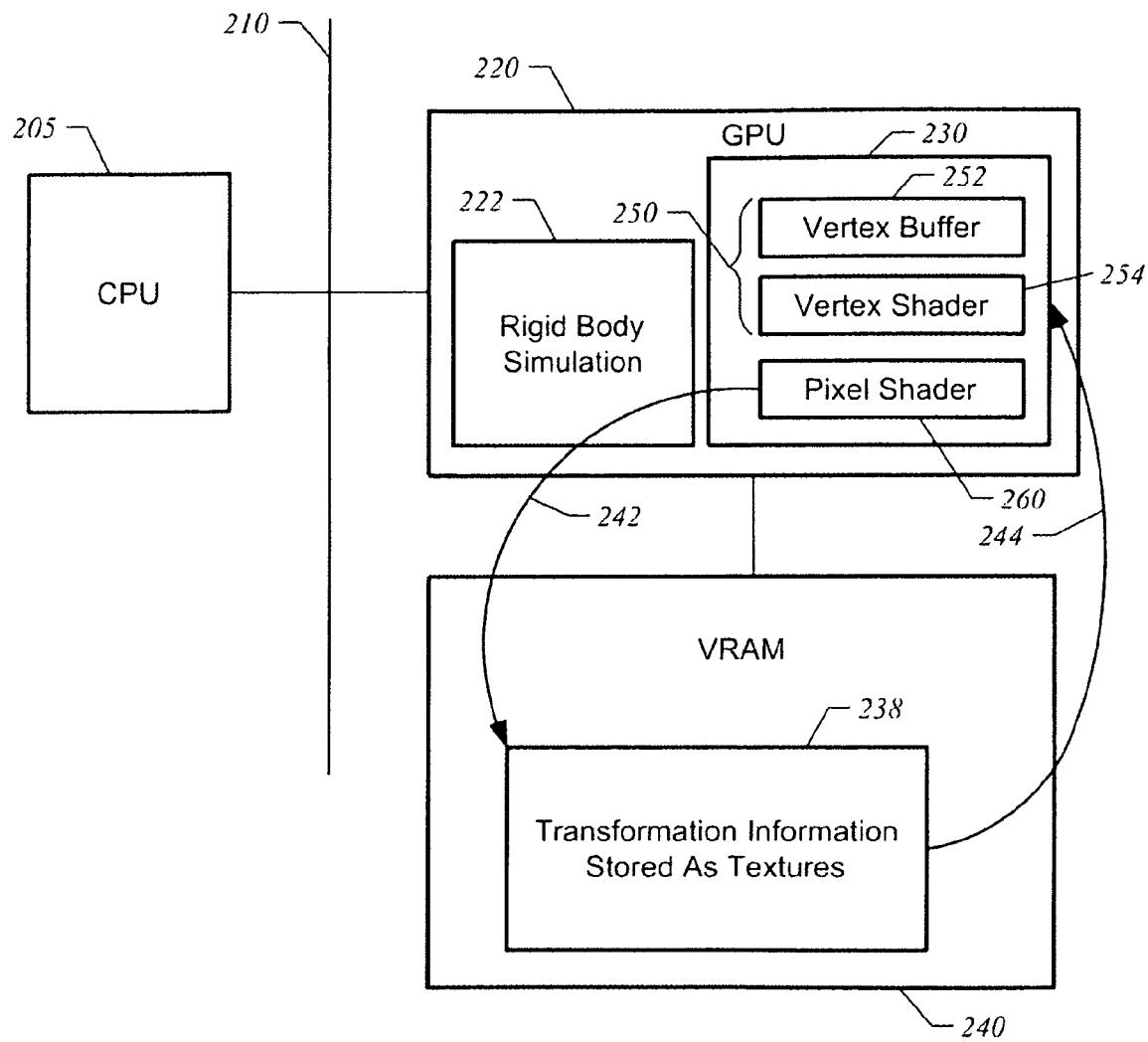
FIG. 2 is a block diagram illustrating a system for rendering objects with position and orientation transformations performed on a graphics processing unit in accordance with one embodiment of the present invention.

FIG. 2 illustrates a graphics system in accordance with one embodiment of the present invention. A central processing unit (CPU) 205 is communicatively coupled to a graphics processing unit (GPU) 220 via an interface 210 such as a bridge. GPU 220 includes a software program 222 for calculating changes to the position and orientation of objects, such as a rigid body simulation program capable of performing at least a portion of a rigid body simulation. For example, GPU 220 may be a general purpose GPU (GPGPU) capable of being programmed to perform scientific calculations.

GPU 220 includes a graphics pipeline 230 which includes a geometry processing portion 250 for performing geometry processing. Geometry processing portion 250 includes a vertex buffer 252 and vertex shader 254 and may also include other conventional geometry processing stages (not shown). A graphics pipeline typically performs a sequence of coordinate transformations to render an object. An object is initially represented in an object space in which vertices within an object are relative to the object's coordinate system. The position and orientation of the object are then transformed to a world space, which includes the position and orientation for all items. Finally, the object is transformed to two-dimensional screen space. These coordinate transformations typically occur in stages of graphics pipeline 230 that perform geometry processing, such as vertex shader 254. In particular, vertex processing typically includes matrix transformation processes to transform the vertices between the different spaces. The processing of pixels occurs after geometry processing. Conventionally the processing of textures is performed in pixel processing portions of a graphics pipeline, such as in a pixel shader 260. A pixel shader converts a set of texture coordinates into a color (e.g., red, green, blue, and alpha (RGBA) using a shader program. However, programmable pixel shaders may also be programmed to perform other tasks as well. Background information on graphics pipelines is described in the *OpenGL® Graphics System Specification Version* 2.0, the contents of which are hereby incorporated by reference.

In accordance with the present invention, GPU 220 renders objects with the geometry processing portion 250 performing vertex transformations based on transformation information 238 stored as a texture in a graphics memory 240, such as a video RAM (VRAM). In one embodiment, a simulation is performed and pixel shader 260 writes transformation information 238 into graphics memory 240 as textures as indicated by arrow 242. Objects are then rendered with the geometry processing portion 250 of graphics pipeline 230 reading the transformation information 238 from graphics memory 240 as indicated by arrow 244 and then applying a matrix transformation to the vertices of objects to adjust the position and orientation of objects.

Figure 3:
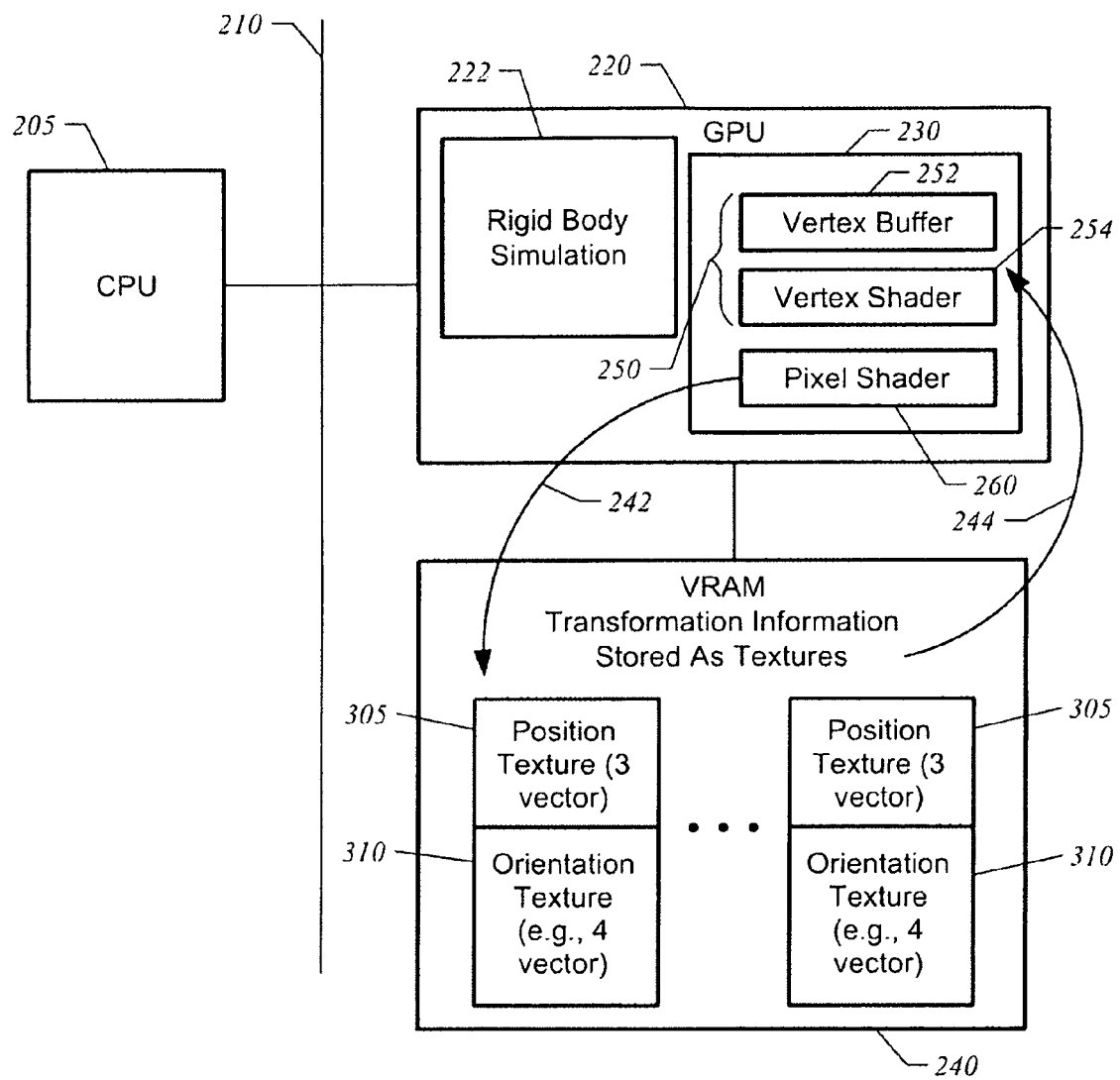
FIG. 3 illustrates the system of FIG. 2 with position information and orientation information stored as textures in video memory for a plurality of objects in accordance with one embodiment of the present invention.

FIG. 3 illustrates an example of the system of FIG. 2 in which the transformation information 238 comprises position information 305 and orientation information 310 that are stored for each object as two textures in the graphics memory 240 by pixel shader 260. The position of an object is stored as a three vector, i.e., as three numbers, such as three floating point numbers. The orientation of the object may be stored as a representation of the rotation of the object about an axis. For example, in one embodiment the orientation of an object is stored as four numbers representing a quaternion, such as four floating point numbers. A quaternion represents an axis and rotation about it. As is well known in physics, a quaternion may be used instead of a rotation matrix to define an orientation of an object. In this embodiment illustrated in FIG. 3, the vertex shader 254 reads the position and orientation information from graphics memory 240 and then determines the appropriate transformation matrix to apply to the object.

Figure 4:
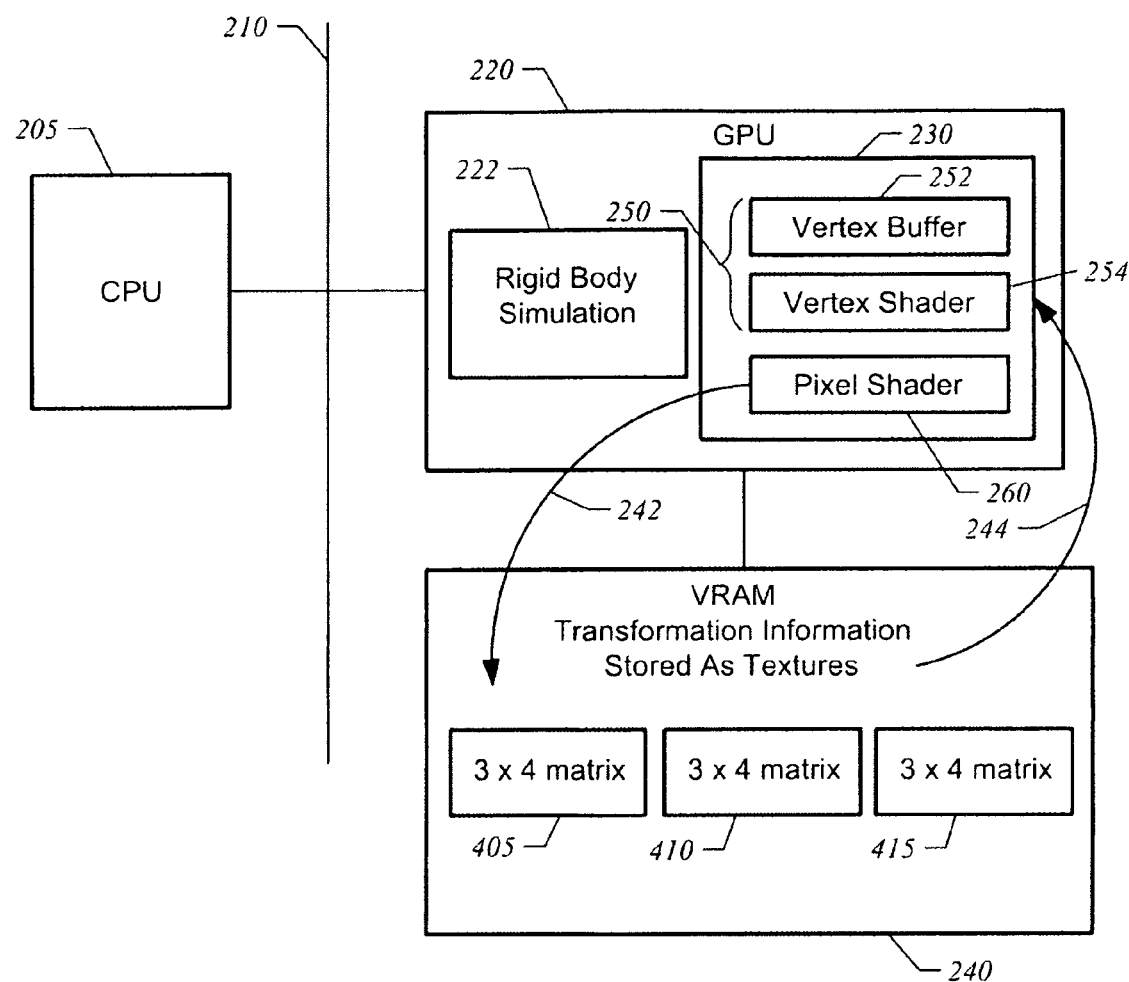
FIG. 4 illustrates the system of FIG. 2 with transformation matrices stored as textures in video memory for a plurality of objects in accordance with one embodiment of the present invention.

FIG. 4 illustrates an example of the system of FIG. 2 in which the transformation information 238 comprises a transformation matrix for an object that is stored as three textures 405, 410, and 415 for each object corresponding to a set of sub-matrices. This embodiment requires additional processing to convert position and orientation textures into a set of textures representing a transformation matrix. In particular, pixel shader 260 may be used to take position information and orientation information and convert it into transformation matrices, which are a more efficient representation for vertex shader 254 to perform vertex transformations to render the object. In one embodiment, three textures 405, 410, and 415 are stored in graphics memory 240 for each object, each texture representing a different row of a 3×4 transformation matrix for one object.

Note that the actual transformation of vertices is performed by a program within vertex shader 254, which takes vertices in object space, applies a transformation matrix using the transformation information stored as a texture in the graphics memory, converts the vertices to proper position in world space, and then by a view projection matrix transforms the object to a homogeneous two-dimensional clip space. Vertex shader 254 may access the transformation information in several different ways. In particular, several extensions of conventional graphics languages, such an OpenGL and DirectX, may be used to permit data stored as a texture to be read as geometry data either by a vertex buffer or directly by a vertex shader. See, e.g., the papers "GeForce 6 Series OpenGL Extensions," by Simon Green, published by the Nvidia Corporation of Santa Clara, Calif.; "Special Effects in Direct3D," by Greg James, presented at the GameDevelopers Conference 2005 and also published by the Nvidia Corporation, "Shader Model 3.0: Using Vertex Textures," by P. Gerasimov et al., published by the Nvidia Corporation, the contents of each of which are hereby incorporated by reference. In one embodiment, a "render to vertex array" command is used to provide the transformation information to vertex buffer 252. The render to vertex array command is an OpenGL® extension that allows a GPU to interpret floating point frame buffer data as geometry data. In another embodiment, a vertex texture fetch is used to provide the transformation information to vertex shader 254.

Note also that the present invention may be applied to rendering multiple objects using instancing commands. Instancing is an efficient way to draw large number of objects with the same API call. The Direct3D graphics language includes an instancing setting that optimizes the rendering of objects that appear multiple times in a frame. One instance of the object is replicated and used as many times as needed using the same draw call. Thus if there are instances (i=0 to N) of an object and the object has (j=0 to M) vertices, a transformation is performed for each vertex[j] by a matrix[i] for each instance.

Figure 5:
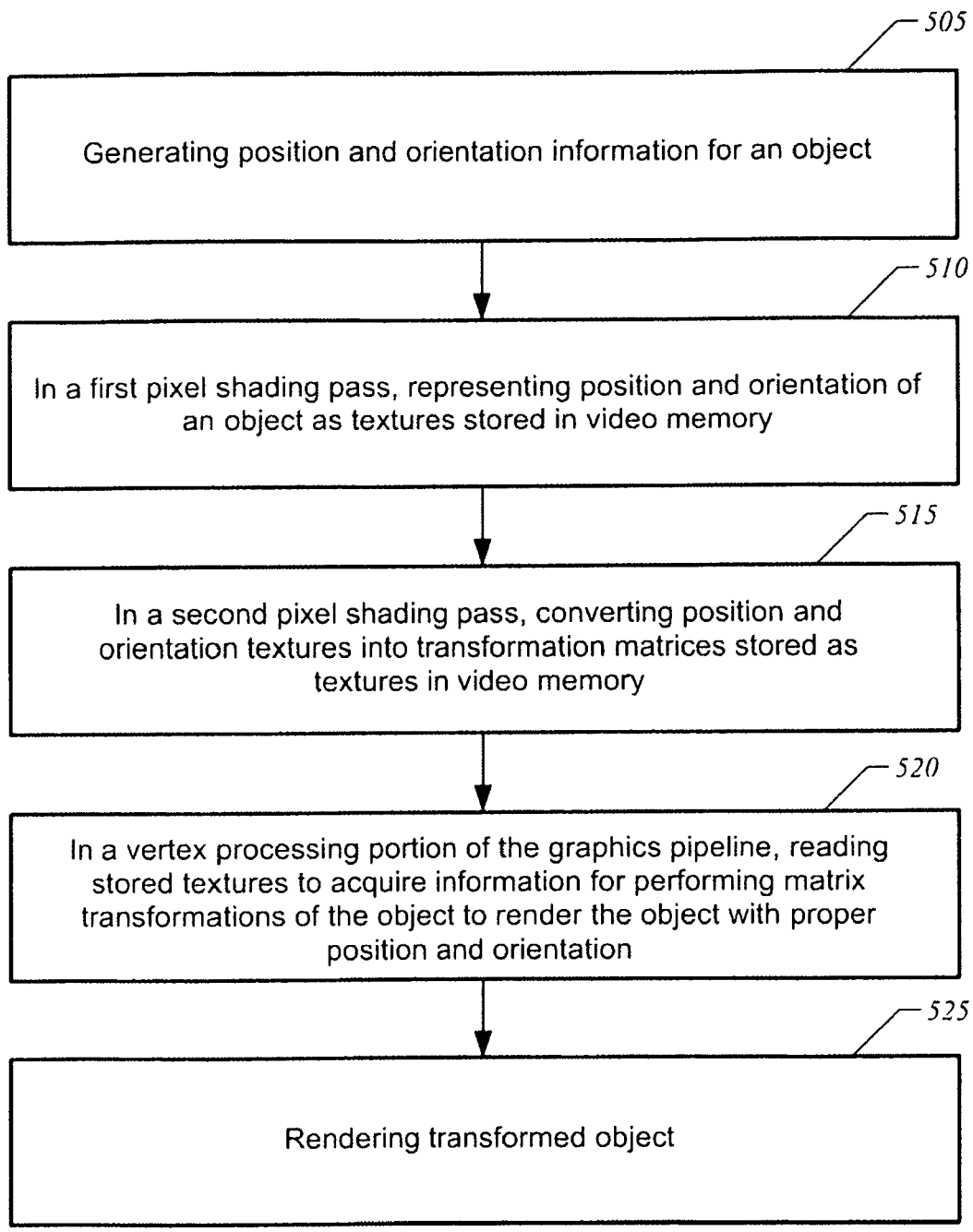
FIG. 5 illustrates a method of rendering objects in accordance with one embodiment of the present invention.

FIG. 5 illustrates a flow chart of a method in accordance with one embodiment of the present invention. Position information and orientation information are generated 505 on the GPU. In a first pixel shading pass of the pixel shader, position and orientation information are stored 510 as textures in the graphics memory. In a second pixel shading pass, the position and orientation information stored in the graphics memory are converted 515 into transformation matrices that are stored as textures in the graphics memory. The vertex program within the vertex shader reads 520 the stored transformation matrices and performs the matrix transformation required to render the object with the proper position and orientation. The object is then rendered 525.

Figure 6:
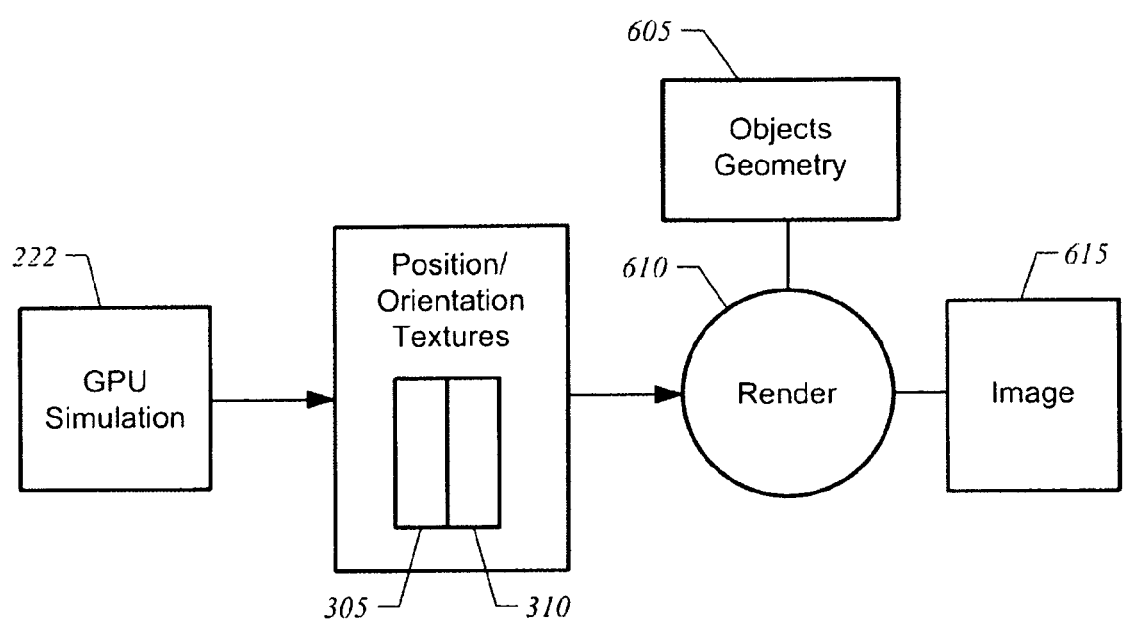
FIG. 6 illustrates another method of rendering objects in accordance with one embodiment of the present invention.

FIG. 6 illustrates the rendering process for the case where the transformation information comprises position information 305 and orientation information 310 stored as textures. The GPU simulation 222 is used to generate the position information 305 and orientation information 310 describing changes to position and orientation of objects, which are stored as textures. For example, GPU simulation 222 may comprise all or part or a rigid body simulation for calculating changes to the position, orientation, and momentum of interacting objects that collide with each other. The position information 305 and orientation information 310 are provided to the vertex program to generate the appropriate transformation of the vertex coordinates of the object geometry of objects 605 to be rendered 610. The rendered image 615 may then be then displayed on a display screen (not shown).

Figure 7:
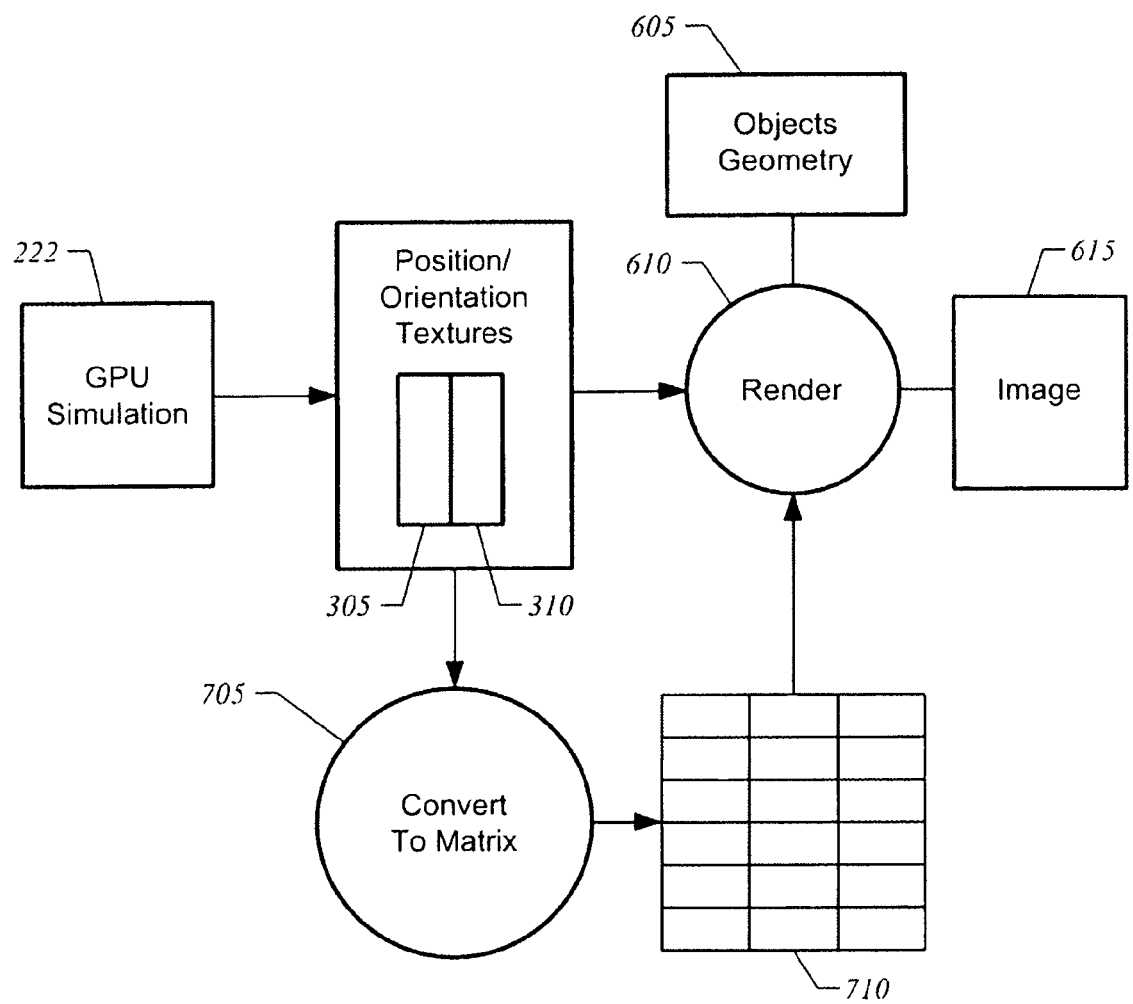
FIG. 7 illustrates another method of rendering objects in accordance with one embodiment of the present invention.

FIG. 7 illustrates the rendering process for the case where the transformation information comprises sub-matrices stored as textures. This example is similar to that of FIG. 6, except that the additional step is taken of converting the position information 305 and orientation information 310 into sub-matrices 710 of a transformation matrix in order to reduce the computational burden on the vertex program.

Figure 8:
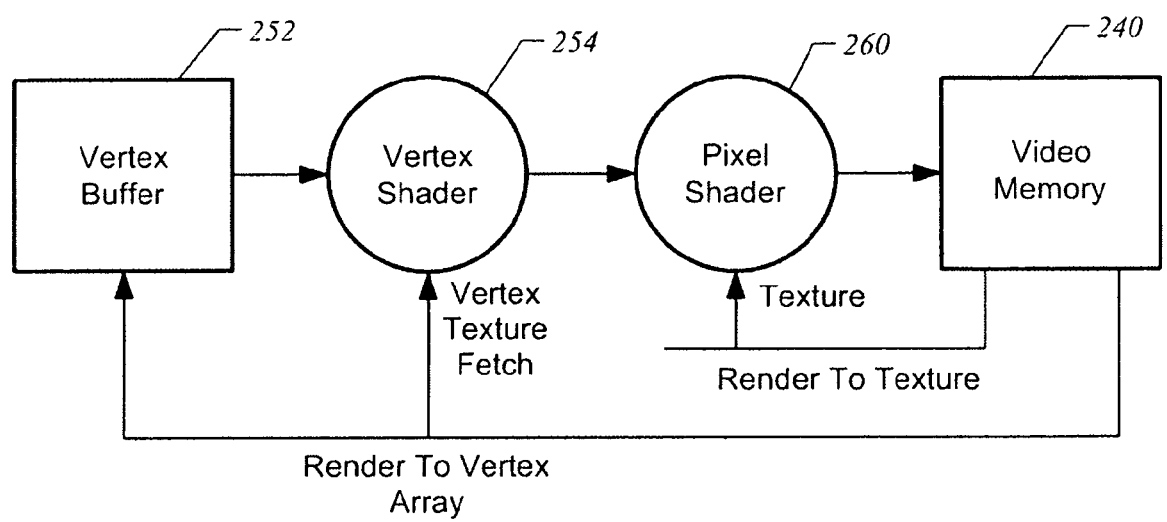
FIG. 8 illustrates feedback pathways in a graphics pipeline for utilizing transformation information stored as textures in accordance with one embodiment of the present invention.

FIG. 8 illustrates in more detail the feedback pathways for utilizing transformation information stored as textures in accordance with one embodiment of the present invention. A vertex texture fetch permits vertex shader 254 to read textures stored in graphics memory 240. A render to vertex array command results in vertex buffer 252 reading textures stored in graphics memory 240. The pixel shader 260 may utilize a render to texture command to store data in textures and convert data in one texture to data of a different type stored in another texture.

One benefit of the present invention is that it permits a GPU to be used to calculate changes to the position and orientation of objects without requiring the GPU to send results back to the CPU for further processing. In particular, the GPU is able to store results of a simulation into a graphics memory as textures such that the graphics pipeline can access the results and apply the appropriate matrix transformation to adjust the position of the vertices to render the object. Thus, for example, in a rigid body simulation the GPU may calculate changes to position and orientation of objects, store the results in a graphics memory, and provide the results to the geometry processing portion of the graphics pipeline such that objects are rendered with the appropriate changes to position and orientation.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics apparatus for rendering objects in a rigid body simulation, comprising:
    a graphics processing unit (GPU) including a graphics pipeline, said GPU configured to determine changes to the position and orientation of a rigid body object and provide transformation information comprising three sub-matrices of a transformation matrix as textures to a geometry processing portion of said graphics pipeline;
    wherein said rigid body object has a geometric surface represented by a plurality of vertices;
    wherein said three sub-matrices are respectively represented by three textures for said object corresponding to different sections of the transformation matrix;
    the transformation matrix providing information for the geometry processing portion of said graphic pipeline to transform the positions of vertices of said rigid body object to be rendered including a transformation from object space into world space; and
    wherein said orientation is represented as a quaternion representing an axis and a rotation about an axis.

2. The graphics apparatus of claim 1, wherein at least one pathway is provided for said geometry processing portion to read said transformation information from a graphics memory.

3. A graphics system, comprising:
    a graphics processing unit (GPU) having a graphics pipeline including:
    a pixel shader configured to store transformation information describing changes in position and orientation of a rigid body object as a set of textures in a graphics memory, a first texture representing position, and a second texture representing orientation, wherein said orientation represents a rotation of said object about an axis, and wherein said rigid body object has a geometric surface represented by a plurality of vertices; and
    a vertex shader configured to read said transformation information from said graphics memory and transform the positions of said plurality of vertices of said rigid body object to be rendered to generate a transformation matrix to transform the plurality of vertices of said rigid body object;
    the transformation matrix providing information for the vertex shader to transform the positions of the plurality of vertices of said rigid body object to be rendered including a transformation from object space into world space.

4. The graphics system of claim 3, wherein said vertex shader utilizes a vertex texture fetch to access said textures.

5. The graphics system of claim 3, further comprising a vertex buffer coupled to said vertex shader, wherein a render to vertex array command is utilized by said GPU to provide said textures to said vertex buffer.

6. The graphics system of claim 3, wherein said orientation is represented as a quaternion representing said axis and said rotation about said axis.

7. The graphics system of claim 3, wherein said transformation information comprises a set of sub-matrices representing a transformation matrix.

8. A graphics system for generating a graphical representation of a rigid body simulation, comprising:
    a graphics processing unit (GPU) including a graphics pipeline,
    a graphics memory coupled to said GPU; and
    at least one pathway for a geometry processing portion of said graphics pipeline to read textures stored in said graphics memory;

said GPU configured to determine changes in position and orientation of rigid body objects, wherein said rigid body objects each have a geometric surface represented by a plurality of vertices;

said GPU configured to store transformation information describing said changes in said position and orientation of said rigid body objects as a set of at least two textures for each of said rigid body objects in said graphics memory, said geometry processing portion of said graphics pipeline reading said transformation information and applying said transformation information to transform the position of said plurality of vertices of said rigid body objects to be rendered including a transformation from object space into world space;

wherein said orientation represents a rotation of said objects about an axis.

9. The graphics system of claim 8, wherein a vertex processing element in said graphics pipeline determines a transformation matrix to transform said plurality of vertices of each of said rigid body objects based on reading transformation information comprising position information and orientation information stored as textures.

10. The graphics system of claim 8, wherein a vertex processing element in said graphics pipeline determines a transformation matrix to transform said plurality of vertices of each of said rigid body objects based on reading transformation information comprising transformation sub-matrices.

11. The graphics system of claim 8, wherein said graphics pipeline comprises a pixel shader configured to store transformation information describing said changes in said position and orientation of said rigid body objects as textures in said graphics memory.

12. The graphics system of claim 11, wherein said geometry processing portion includes a vertex shader configured to read said transformation information from said graphics memory and transform the positions of said plurality of vertices of said rigid body objects to be rendered, said vertex shader utilizing a vertex texture fetch to access said textures.

13. The graphics system of claim 11, wherein said geometry processing portion comprises a vertex buffer and a vertex shader, wherein a render to vertex array command is utilized by said GPU to provide said textures to said vertex buffer.

14. The graphics system of claim 11, wherein said transformation information comprises position and orientation information, and a vertex shader in said geometry processing portion of said graphics pipeline is configured to determine a transformation matrix to transform said plurality of vertices of each of said rigid body objects.

15. The graphics system of claim 8, wherein said orientation is represented as a quaternion representing said axis and said rotation about said axis.

16. The graphics apparatus of claim 1, wherein each of said three textures for said rigid body object represents a different row of the transformation matrix.

17. The graphics system of claim 3, wherein said set of textures for said rigid body object includes only two textures.

18. The graphics system of claim 8, wherein said set of at least two textures for each of said rigid body objects includes only two textures.

* * * * *